(12) United States Patent
Jagusch

(10) Patent No.: US 6,506,108 B1
(45) Date of Patent: Jan. 14, 2003

(54) BACON HANGER

(75) Inventor: Wayne E. Jagusch, Arlington Heights, IL (US)

(73) Assignee: Beacon, Inc., Hillside, IL (US)

( * ) Notice: Subject to any disclaimer, the term of this patent is extended or adjusted under 35 U.S.C. 154(b) by 3 days.

(21) Appl. No.: 09/723,646

(22) Filed: Nov. 28, 2000

(51) Int. Cl.$^7$ ............................................. A22C 15/00
(52) U.S. Cl. ..................................................... 452/193
(58) Field of Search ....................... 452/193; 294/81.56, 294/85

(56) References Cited

U.S. PATENT DOCUMENTS

| | | |
|---|---|---|
| 1,825,879 A | 10/1931 | Louthian |
| 3,090,990 A | 5/1963 | Graper ........................ 17/44.3 |
| 4,172,305 A | 10/1979 | Henebry et al. .............. 17/44.3 |
| 5,423,721 A | 6/1995 | Roush et al. ................ 452/193 |
| 5,938,522 A | 8/1999 | Jagusch et al. ............. 452/193 |

*Primary Examiner*—Peter M. Poon
*Assistant Examiner*—F. C Copier
(74) *Attorney, Agent, or Firm*—McAndrews, Held & Malloy Ltd.

(57) ABSTRACT

A hanger designed for supporting pork bellies during handling and processing into slabs of bacon which is characterized by a generally rectangular base frame with a top bar and a bottom bar, and a series of generally L-shaped prong members attached to the base frame and defining a prong assembly extending laterally from the base frame. The prong members are attached to the bottom bar opposite the side of the prong assembly. The prong assembly includes a cross bar spaced from and generally parallel to the base frame that defines a space between the cross bar of the prong assembly and the base frame. The space is designed to receive the latch of a mechanical device for removal of the hanger from the pork belly.

8 Claims, 1 Drawing Sheet

BACON HANGER

CROSS-REFERENCE TO RELATED APPLICATION

None.

STATEMENT REGARDING FEDERALLY SPONSORED RESEARCH OR DEVELOPMENT

None.

BACKGROUND OF THE INVENTION

This invention relates to equipment for supporting and handling articles, particularly meat products, in manufacturing and processing operations and is more particularly concerned with improvements in bacon hangers or combs for supporting pork bellies during processing to form slabs of bacon.

In the slaughtering or butchering of hogs the various portions or cuts into which the animal carcass is divided are prepared for marketing by meat packers and processors according to the type of cut and the form in which it is desired to present it to the consumer. Generally, cuts known as pork bellies are processed by suspending them for a predetermined time in a processing area, such as a smoke house, or similar curing area, where they are converted into slabs of bacon which may be supplied to the consumer in a solid piece or cut into slices after sizing and packaged to provide the familiar sliced bacon package.

In the conventional butchering and processing operation, pork bellies are transported from the butchering or cutting area to an area where they are located on bacon hangers which serve to support the bellies on a tree or rack while they are being processed. When the processing or curing is completed, the bacon slabs are removed from the hangers enabling reuse of the latter.

The bacon hangers which have been provided heretofore have been formed with pointed prongs or teeth arranged as in a comb and mounted on a frame depending from a bracket member which is shaped or otherwise formed for engaging an overhead rail, track bar, smokestick or the like. Generally, the hangers have been constructed so that the hanger teeth or prongs can be readily inserted into the relatively soft area along the top ends of the bellies by holding the bellies and pressing the teeth into the same, with some portion of the frame serving as a handle for gripping it while guiding the teeth into the meat. During processing the meat loses moisture, shrinks and tends to solidify and become firm, with resulting tightening around the teeth or prongs which makes it difficult to withdraw the prongs so as to separate the processed slabs from the hangers.

Generally, the hangers have been grasped at one end and pulled, while the bacon slab is held, so as to progressively work the prongs loose from the bacon causing repetitive stress on the hands, wrists and arms of the person removing the hanger resulting in possible physical injury. Such removal also frequently results in damage to the hanger because the prongs can be bent and sometimes broken loose from the hanger thus leaving a prong in the slab which can create a hazard during slicing where contact with high speed knives can result in serious damage to the knives and possible injury to personnel in the vicinity of the slicing machine. Such hangers of the prior art are described in U.S. Pat. No. 4,172,305.

SUMMARY OF THE INVENTION

A proposed improvement to address the problems of the above-described bacon hangers is addressed in U.S. Pat. No. 5,938,522. The bacon hanger of the '522 patent includes a bottom bar with an offset extending laterally from the base frame in a direction opposite the prong assembly but mounted on the meatside of the bacon hanger. The offset is designed to receive the latch of a mechanical device so that the bacon hanger can be easily removed from the pork belly. Although the bacon hanger of the '522 patent provides substantial benefits over the prior art, it is not easily stackable or nested with other bacon hangers of a similar or different design. This creates a storage and accessibility problem.

It is a general object of the present invention to provide an improved hanger structure for use in handling cuts of meat, particularly pork bellies, following butchering operations and during subsequent handling and processing operations.

It is a more specific object of the invention to provide a new and improved hanger structure which is especially adapted for suspending pork bellies and removal of the hanger from the bellies so as to facilitate handling, storage, retrieval and processing to convert the bellies into slabs of bacon.

A further object of the invention is to provide an improved hanger structure of the type having a plurality of spaced prongs in comb-like arrangement for insertion in pork bellies and removal from pork bellies or similar cuts so as to support the same during handling and/or processing wherein the hanger is provided with a gripping area arranged relative to the prongs so as to enable engagement by a mechanical device that is adapted for withdrawing the prongs from the meat when it is processed and the resistance to withdrawal of the prongs has greatly increased.

Another object of the invention is to provide a hanger structure for handling meat cuts which is characterized by a series of meat engaging prongs mounted on a supporting frame and constructed so as to minimize any tendency of the prongs to break loose from the supporting frame when the frame is mechanically manipulated to withdraw the prongs from engagement in the meat.

Still another object of the invention is to provide an improved bacon hanger structure having meat penetrating prongs arranged to extend in a plane at an angle to the plane of an elongate support frame, with the frame being adapted to be disposed vertically and the prongs constituting end portions of leg formations on rod members which are bent into "U" shape and which are part of the vertically disposed support frame or which are secured to the support frame by the portions of the leg formations which adjoin the bight forming portion of the "U" shape.

A still further object of the invention is to provide a bacon hanger with all of the above-features that is also easily stackable or nested with other bacon hangers, on a carrying device or stand and easily retrieved for usage from said carrying device.

The invention as disclosed and claimed herein comprises an elongate support frame adapted to be disposed in a generally vertical plane and in depending relation from a support bracket, a plurality of spaced article engaging prongs extending generally normal to the plane of the frame, a gripping member secured to the support frame, having all weld positions under compression while under stress caused by the weight of the belly and/or stress caused by the engagement of a mechanical device used to extract the hanger prongs from the processed pork belly and a spaced cross bar welded to the prongs between the gripping member and the ends of the prongs. The gripping member is characterized by a cross bar that is welded on the prong side of the hanger frame and prongs. This arrangement controls the extent to which the prongs are inserted into the belly. In this way even when the belly fully engages the prongs there remains an opening between the spaced cross bar and the gripping member. This space may be engaged by a mechanical device when the article must be removed from the hanger of the present invention.

The aforesaid and other objects and advantages of the invention will become more apparent upon consideration of the preferred form of the hanger structure which is illustrated in the accompanying drawings wherein like parts are identified by the same numerals throughout the views.

DESCRIPTION OF THE PREFERRED EMBODIMENT OF THE INVENTION

Figure 1:
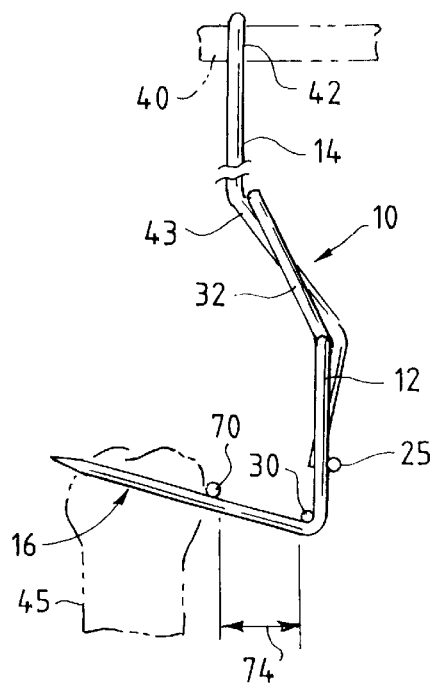
FIG. 1 is an end view of a hanger structure which is particularly adapted for use in suspending cuts of meat in a processing area with the hanger being shown in the position it will assume when mounted on an overhead support bar or track member.

As illustrated in the drawings the hanger 10 is designed particularly for use in suspending pork bellies for transportation and during processing or curing, such as a smoke house, cooking oven and/or refrigeration chamber. The hanger is designed so that it may be hung on a tree, in a cage, on a truck, rail or rack and moved to or through the processing area or system where it may be supported in the same manner or carried on a conveyor, or the like, during the processing and subsequent handling.

To the extent that the hangers depicted in the accompanying Figures retain common or comparable elements from Figure to Figure, the same reference numerals will be applied to such elements, which will not always be separately explained for such Figure.

Figure 2:
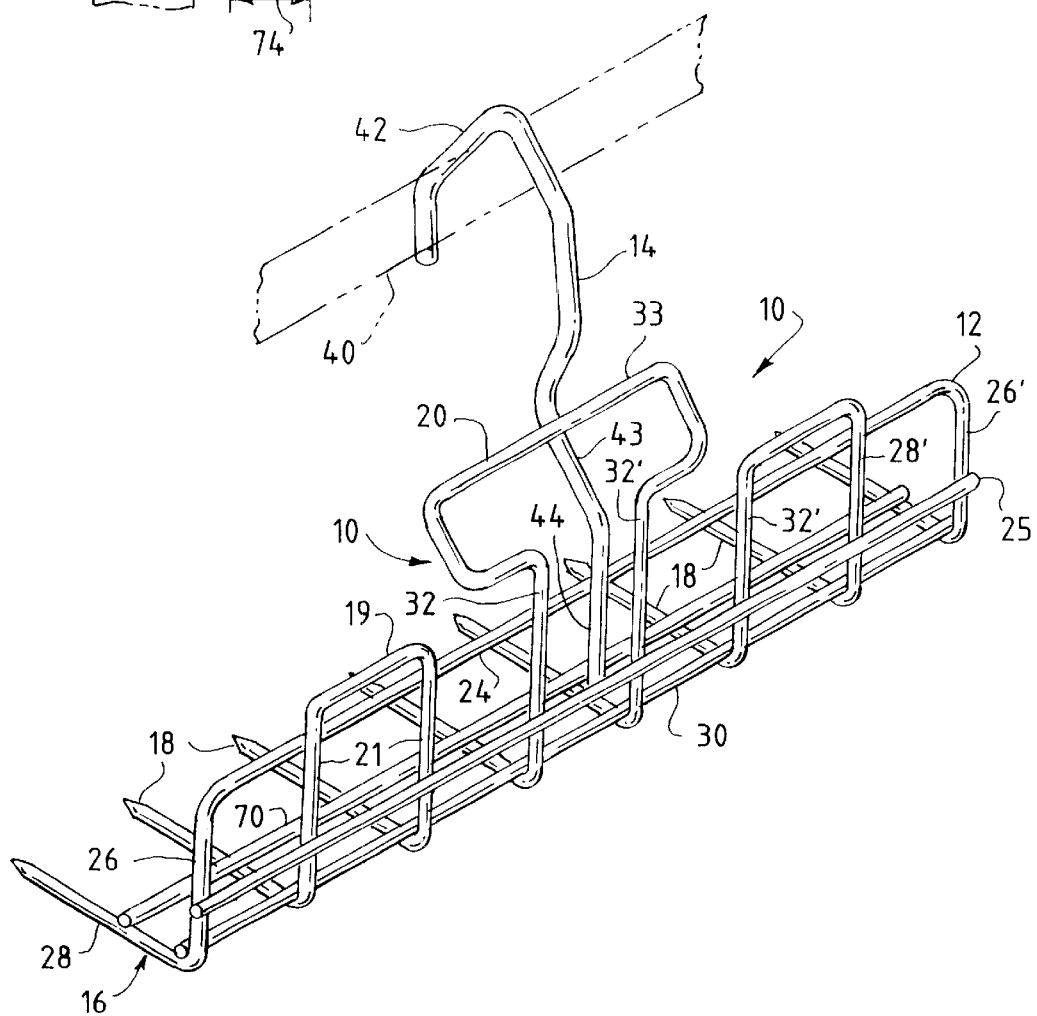
FIG. 2 is a perspective view of the hanger structure of FIG. 1 showing the spaced relationship between the spaced cross bar and the gripping members.

Referring to FIGS. 1 and 2, the hanger 10 of the present invention comprises an elongate supporting frame 12 which is secured in vertically disposed depending relation on a hook-forming bracket 14 and which carries a prong assembly 16 of meat engaging prongs 18, which are arranged after the fashion of teeth in a comb, and which extend in a common plane in a generally normal direction from one side of the vertical support frame 12 and along the bottom thereof. In addition to the hook-forming bracket 14, the support frame 12 is provided with a hand-gripping member 20 extending above the top of the support frame 12 and in a plane inclined from the plane of the support frame 12 and slightly in the direction of the prong assembly 16. The support frame 12 includes a crossbar 25 that is attached to the backside of leg formations 26, 26' at about their midpoint and a bottom gripping member 30 that is attached to the front side of the leg formations 26, 26' at their lower end.

The prong assembly 16 includes a spacing cross bar 70 attached to the topside of the prongs 18 and spaced from the gripping member 30 to create a space 74. The spaced cross bar 70 controls the extent to which the prongs 18 are inserted into the pork belly 45. When the pork belly 45 is mounted on the prong assembly 16 of the hanger 10, the space 74 provides an opening that may be engaged by a mechanical device (not shown) often used in removing a bacon hanger 10 from a processed pork belly 45.

The several elements of the hanger structure 10 in the form illustrated are fabricated from lengths of metal rod material, of suitable gauge, which are bent as shown and joined or connected by welding, or secured to each other in a similar manner. Preferably, the rod or bar material will be stainless steel so as to afford the most desirable sanitation during use.

The elongate support frame 12 is formed by bending a length of rod stock into a U-shape so as to form a relatively long bight portion, which serves as the top bar 24 of the support frame 12, and leg formations 26, 26' which are further bent intermediate their ends so as to provide the end prongs 28, 28' in the prong assembly 16. The end prongs 28, 28' extend in a plane at an angle slightly less than normal to the plane of the support frame 12 as best seen in FIG. 1. The crossbar 25 and the gripping member 30 connect the two leg formations 26, 26' and are in spaced parallel relation below the top bar 24 so as to form the generally rectangular frame support for the meat engaging prong assembly 16.

The prongs 18 intermediate the two end prongs 28, 28' are formed in pairs and attached to the support frame 12. Each pair thereof is formed from a section or length of rod or bar stock by bending it into U-shape so as to provide a bight portion 19 and spaced parallel leg formations 21. The leg formations 21 are further bent intermediate their ends to provide a pair of prongs 18. The prongs 18 extend in a plane at an angle to the plane of the balance of the member which is secured on the support frame 12 so that portions of the legs formations 21 adjoining the bight portion 19 span the area from the top bar 24, the crosssbar 25, and the bottom gripping member 30 of the support frame 12. The leg formations 21 are preferably attached to the backside of the top bar 24, the prongside of crossbar 25, and the backside of the bottom gripping member 30 enabling a structure in which the welds of the legs of the support frame 12 and the leg formations 21 of the prong assembly are under compression while supporting the weight of the pork belly 45, shown in phantom, and the welds of the gripping members 30 are under compression when the hanger 10 is being extracted from the belly 45 by a mechanical device.

The grip or handle 20 is formed by bending a section or length of bar or rod material into a U-shaped configuration with spaced apart leg formations 32, 32' which are further bent to provide a pair of the prongs 18 and the assembly is mounted on the frame bars or rods 24, 25, 30. Specifically, the leg formations 32, 32' are attached to the backside of top bar 24, the prongside of the crossbar 25 and the backside of the bottom gripping member 30. The bight portion 33 which forms the grip or handle 20 is spaced above the top frame bar 24 a sufficient distance to accommodate the fingers in grasping the same and may be bent out of the plane of the frame 12, as shown, in the direction of the prong assembly 16 to provide a better balance in handling. The leg formations 32, 32' may also be bent at intermediate points to provide the desired distance between the resulting prongs.

The bottom gripping member 30 is welded to the prong side of leg formations 26, 26', 32, 32' and the U-shaped members that form the remaining prongs 18. The bottom gripping member 30 is welded at or near the point where the leg formations 26, 26', 32, 32' and the U-shaped members bend from the vertical to the horizontal. As noted above, a mechanical gripping device (not shown) may engage the space 74 defined between the bottom gripping bar 30 and the spacing bar 70 to pull the hanger 10 away from the pork belly, shown in phantom at 45, thereby eliminating the need for direct human grasping of the hanger and working the hanger out of the pork belly 45 protecting the integrity of the hanger and protecting the worker from injury.

The hook-forming bracket 14, which is provided to mount the support frame 12 on a rack or support bar, indicated in phantom line at 40, is formed from a length or section of bar or rod stock which is best shown to provide a downwardly opening hook 42 at the top and a straight terminal end section 44 for spanning the space between the top bar 24 and crossbar 25 with an intermediate portion 43 bent to position the hook 42 in a vertical plane offset from the plane of the frame 12 for better balance in handling. The intermediate portion 43 is preferably attached to the prongside of bight portion 33 of hand-gripping member 20 and the backside of the bight portion 24 of the support frame 12. The end section 44 is preferably attached to the prongside of crossbar 25.

In the form shown in FIG. 2, the angle of the prongs 18 relative to the angle of the hook 42 is so determined to have the prongs in a plane at a slight angle above horizontal. When a belly is on the hanger this eliminates the possibility of the belly slipping off the hanger.

In using the hanger 10, one or more pork bellies 45 may be suspended depending upon their size relative to the size of the hanger 10. The prong assembly 16 may be conveniently engaged in the top marginal portion of the meat while the user grasps the hanger grip member 20. When the withdrawal of the prong assembly 16 is desired it is facilitated by utilizing a mechanical gripping device (not shown) to engage the space 74 and pull in the direction away from the pork belly 45 thereby exerting a direct withdrawal force substantially in the plane of the prong assembly 16.

When the bacon hanger 10 is not in use, it can be easily stored stacked or nested with other bacon hangers. The elimination of any rearside offsets, as provided in the prior art, in combination with the space 74 permits such easy storage while still accommodating the latch of a mechanical device for removing the belly from the hanger 10.

While the invention has been described with reference to preferred embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the appended claims.

What is claimed is:

1. A hanger structure adapted for suspending a meat product during processing, the hanger structure comprising an elongate generally rectangular base frame adapted to be positioned in a generally vertical plane, the base frame having a meatside and a backside, the base frame being formed by a first bar member and a second bar member, the first bar member having an inverted U-shaped configuration and having a top bight forming portion and opposed spaced side leg members, the bight forming portion generally parallel to the second bar member, the second bar member having ends, the ends connected to the meatside of the leg members, a plurality of members in the form of pointed prongs adapted to be pressed into engagement with the meat product, which prongs are spaced along the bottom edge of the base frame and are in a plane extending laterally from the meatside of the base frame, and a third bar member attached to the prongs generally parallel to the second bar member, the third bar member displaced along the prongs to form a space between the third bar member and the second bar member.

2. A hanger structure as set forth in claim 1 wherein the leg members of the U-shaped first bar member on the base frame have terminal end portions shaped so as to form a pair of the pointed prongs.

3. A hanger structure as set forth in claim 1 wherein the prongs are arranged in pairs and the pairs of prongs are formed as terminal end sections of U-shaped rod members which have leg portions constituting a part of the base frame with the terminal end sections being bent at an angle to the plane of the base frame so as to extend in a common lateral plane.

4. A hanger structure as set forth in claim 3 wherein the second bar member is connected to the meatside of the U-shaped rod members.

5. A hanger structure as set forth in claim 1 wherein the hanger structure further includes a hook forming bracket that extends above the rectangular base frame and is attached to the first bar member.

6. A hanger structure adapted for suspending a meat product during processing, the hanger structure comprising an elongate generally rectangular base frame adapted to be positioned in a generally vertical plane, the base frame having a meatside and a backside, the base frame being formed by a first bar member, a second bar member, and a middle bar member, the first bar member having an inverted U-shaped configuration and having a top bight forming portion and opposed spaced side leg members, the bight forming portion generally parallel to the second bar member, the second bar member having first ends, the first ends connected to the meatside of the leg members such that the second bar member is in spaced relation to the bight forming portion of the first bar member, the middle bar member having second ends, the second ends connected to the leg members such that the middle bar member is in spaced relation between the bight forming portion of the first bar member and the second bar member, a plurality of members in the form of pointed prongs adapted to be pressed into engagement with the meat product, which prongs are spaced along the bottom edge of the base frame and are in a plane extending laterally from the meatside of the base frame, and a third bar member attached to the prongs generally parallel to the second bar member, the third bar member displaced along the prongs to form a space between the third bar member and the second bar member.

7. A hanger structure as set forth in claim 6 wherein the leg members of the U-shaped first bar member on the base frame have terminal end portions shaped so as to form a pair of the pointed prongs.

8. A hanger structure as set forth in claim 6 wherein the prongs are arranged in pairs and the pairs of prongs are formed as terminal end sections of U-shaped rod members which have leg portions constituting a part of the base frame with the terminal end sections being bent at an angle to the plane of the base frame so as to extend in a common lateral plane.

\* \* \* \* \*